United States Patent
Cai

(10) Patent No.: US 7,422,153 B2
(45) Date of Patent: Sep. 9, 2008

(54) DECODING WITH DATA FROM MULTIPLE SCANS

(75) Inventor: Joseph Cai, Rocky Point, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 335 days.

(21) Appl. No.: 11/290,169

(22) Filed: Nov. 30, 2005

(65) Prior Publication Data

US 2007/0119944 A1    May 31, 2007

(51) Int. Cl.
*G06K 7/10*    (2006.01)
(52) U.S. Cl. .............................. 235/462.01; 235/462.12
(58) Field of Classification Search ............ 235/462.01, 235/462.12
See application file for complete search history.

(56) References Cited

U.S. PATENT DOCUMENTS 6,296,187 B1 * 10/2001 Shearer ................. 235/462.41
6,648,230 B1 * 11/2003 Kellerman et al. ...... 235/462.25

* cited by examiner

*Primary Examiner*—Daniel Hess
*Assistant Examiner*—Ali Sharifzada
(74) *Attorney, Agent, or Firm*—Tarolli, Sundheim, Covell & Tummino LLP

(57) ABSTRACT

Partial decode results that successfully decode a subset of bar code symbol components and a quality indicator associated with each component are stored. These partial decode results are combined based on the quality indicator to achieve an improved decode of the symbol.

39 Claims, 4 Drawing Sheets

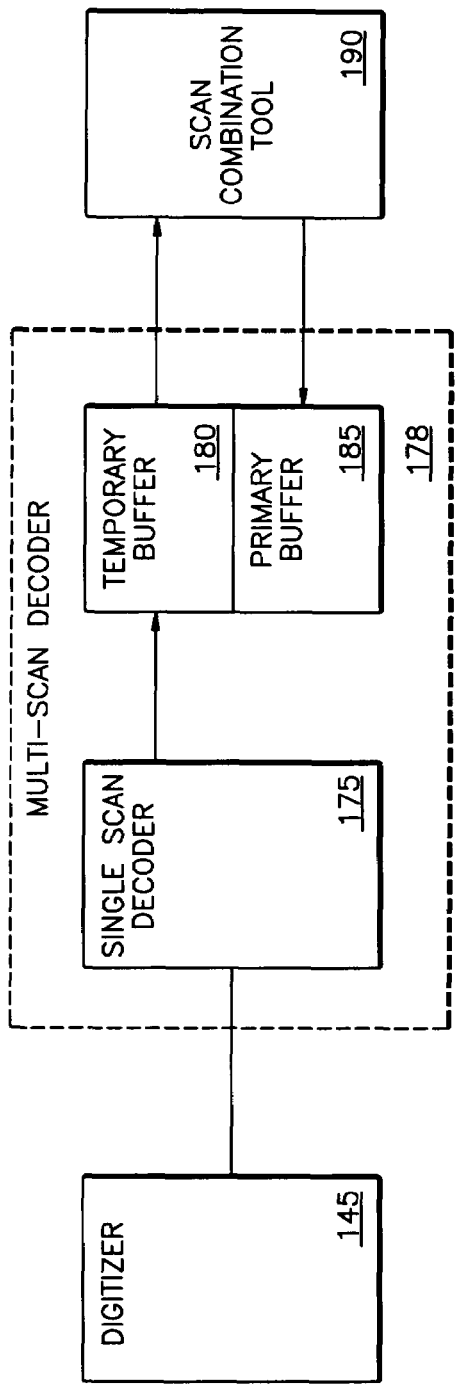

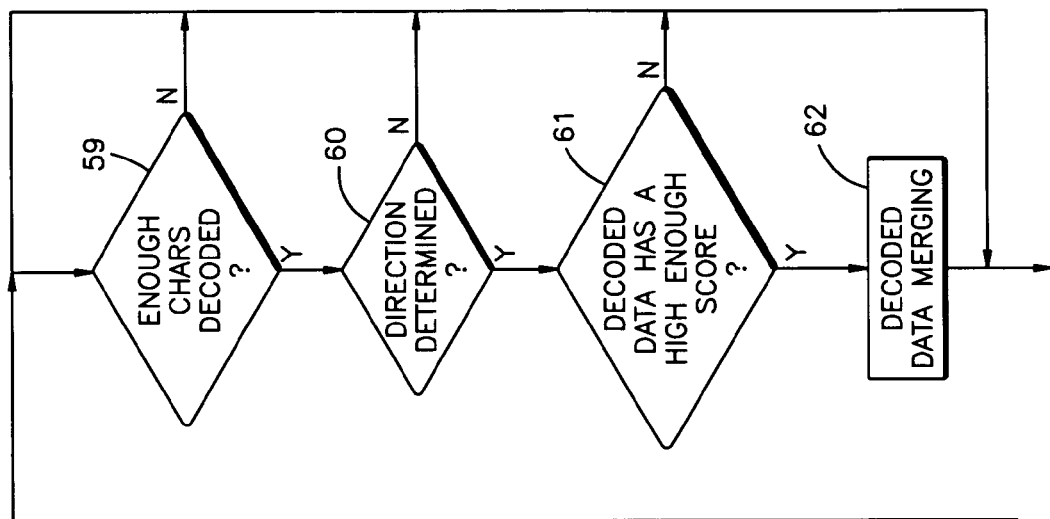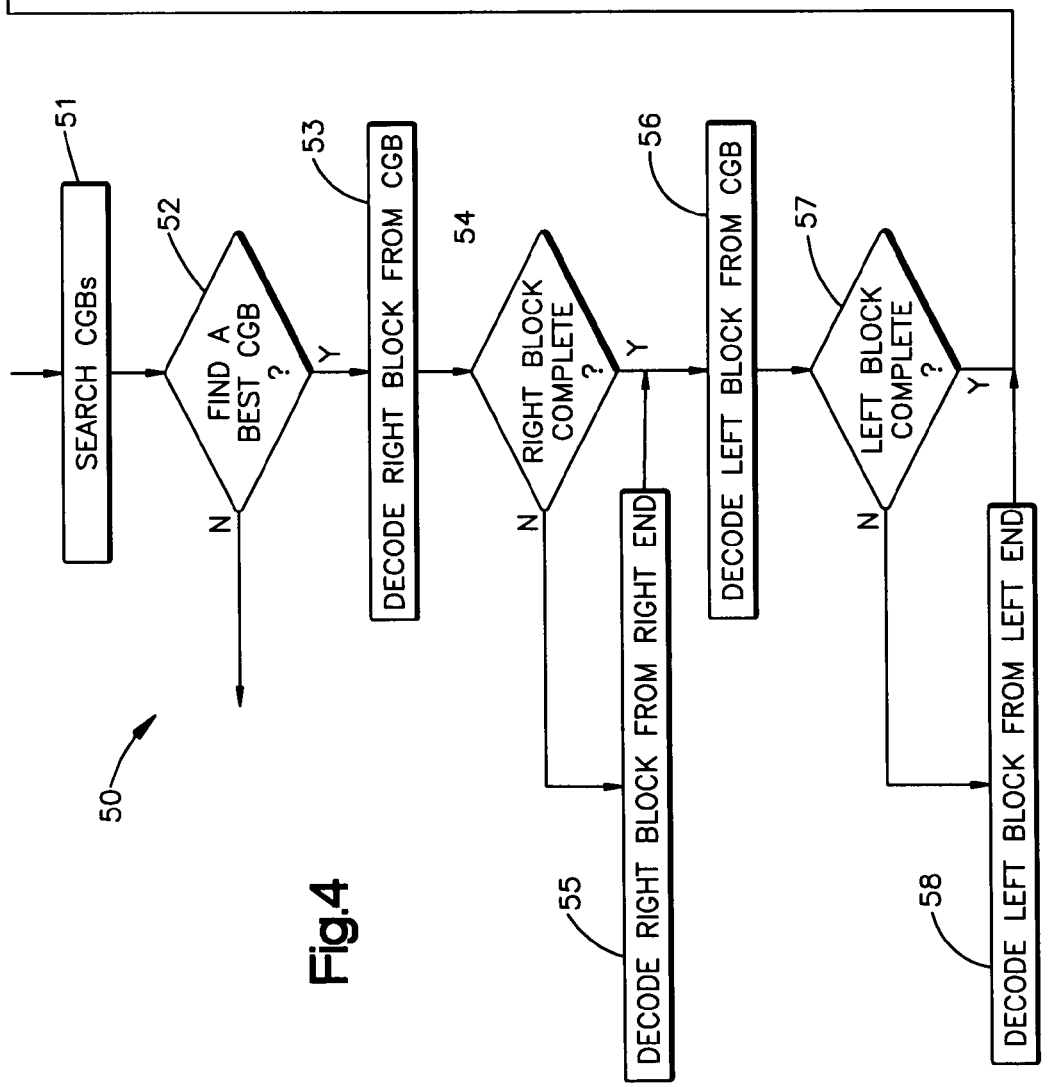
Fig.4

DECODING WITH DATA FROM MULTIPLE SCANS

TECHNICAL FIELD

This invention relates to bar code scanning, and in particular to techniques for decoding bar code symbols using data from multiple scans.

BACKGROUND

A bar code symbol is a coded pattern of indicia comprising a series of bars and spaces having different light reflecting characteristics. Bar code scanning systems electro-optically transform the indicia into electrical signals, which are decoded into alphanumerical characters. Characters are typically represented in digital form and are provided as an input to a data processing system for applications, such as point-of-sale processing and inventory control. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

Bar code symbols are formed from a series of bars and spaces, called elements, which have a variety of possible widths. The specific arrangement of elements defines the character represented according to a set of rules and definitions. To encode a desired sequence of characters, groups of bar code characters are concatenated to form a bar code symbol, with each character of the message represented by a corresponding group of elements. In some symbologies a "start" and "stop" character is used to indicate where the bar code begins and ends. A "center guard bar" indicates the location of the center of the bar code. There are a number of symbologies in use, for example, UPC/EAN, Code 39, Code 128, Codabar, and Interleaved 2 of 5.

In typical laser scanning systems, a light source, such as a laser or laser diode, produces a beam which is directed by a lens or similar optical components along a light path toward a target that includes a bar code symbol on the surface. The beam produces a spot on the target. To scan with a laser system, the spot may be deflected by a mirror that is moved with an oscillating or rotating motor to produce a line or series of lines or curved paths across the symbol. Alternately, the light may be deflected by holographic or other means. A portion of the light that is reflected off the symbol is detected by a sensor which may be positioned in the scanner. The sensor converts the reflected light into an electrical signal which is converted to a digital representation by electronic circuitry. For example, an analog electrical signal from the photo detector may be converted into a pulse width modulated digital signal, with pulse widths corresponding to the physical widths of the bars and spaces.

In an imaging scanner, an image is made of the target surface containing the bar code. The image is stored as pixel data in an array of sensors such as CCD or CMOS sensors. Virtual scans are made of the pixel data to attempt to decode the bar code. Data from the virtual scan is transmitted to the decoder. After several unsuccessful "scans" the image may be discarded and another image may be taken for decoding.

The decoder receives the pulse width modulated digital signal from the scanner, and attempts to decode the scan. If the start and stop characters and all of the characters between them are decoded successfully, the decoding process is finished. Otherwise, the decoder receives a next scan and attempts to decode it. Each attempt is based on the signal received during a single scan. The process continues until a scan is completely decoded or until no more scans are available.

In many instances, data from a single scan is not sufficient to decode the bar code. For example, a scan line or series of scan lines may not always entirely cross the bar code symbol. This may happen when a scanner is in a fixed position next to a conveyor with containers, each of which has a bar code symbol printed on a label. If the label is skewed with respect to the scan line, there may be no single scan line which includes both the start and stop characters. In other situations, part of the bar code may be obscured, damaged or insufficiently illuminated to produce a complete scan line. These incomplete scan lines, called fragments, were discarded until techniques were developed to stitch or combine the fragments together, so that the decoding process can be completed.

Several basic techniques have been employed to combined fragments. One technique, known as block decoding, involves combining predefined regions or blocks in a number of scans. For example, a symbology such as UPC has start, stop, and center characters. If one fragment includes a start and a center, and another fragment includes a center and stop, these two "blocks" can be combined to form a complete scan.

SUMMARY

Saving the results of partially successful decodes that decode a subset of symbol components along with a quality indicator associated with each decoded component allows data from the partially successful scans to be combined to achieve a better decode of the symbol.

Accordingly, a method, computer readable media having instructions for performing the method, and an apparatus are provided that decode a bar code symbol that is made up of a plurality of bar code characters. The bar code symbol is scanned one or more times to obtain one or more signals representative of the bar code characters. The one or more signals are decoded to determine a sequence of scanned bar code character values. A score is associated with each scanned bar code character value. One or more sequences of scanned bar code character values and their associated scores are stored in a first buffer. A second buffer stores a sequence of resultant bar code character values and a cumulative score associated with each resultant bar code character value. One or more resultant bar code character values in the second buffer is updated with corresponding one or more scanned bar code character values based on the score associated with the scanned bar code character.

The score associated with each bar code character value can be computed by determining a level of confidence that the bar code character value is accurate. The resultant bar code character value can be updated by comparing the resultant bar code character value with the corresponding scanned bar code character value. Based on the comparison, the resultant bar code character value is updated. The score associated with the scanned bar code character value is added to the cumulative score when the resultant bar code character value is the same as the corresponding bar code character value. The scanned bar code character value is stored as the resultant bar code value and the score associated with the scanned bar code character value as the cumulative score when no value has yet been stored as the resultant bar code character value. The resultant bar code character value is replaced with the scanned bar code character value when the score associated with the scanned bar code character value exceeds the cumulative score associated with the resultant bar code character value. The resultant bar code character value is changed to unknown when the resultant bar code character value is different from the scanned bar code character value and the difference of scores associated with both values not high enough. Advantageously, the method can be terminated when the cumulative score associated with each character exceeds a predetermined value.

A bar code symbol made up of a sequence of elements grouped into one or sets of characters separated by separation characters is aggressively decoded. The symbol is scanned and one or more bar code characters are identified that may be separation characters. The identified separation bar code character that has a highest score is selected as a working separation character. The bar code characters in proximity to one side of the working separation character are decoded. The bar code characters that are in another side of proximity to the working separation character are decoded. A bar code character value and its score are stored in a first data buffer for each decoded bar code character. A bar code character score is associated with each decoded bar code character.

The identified bar code character can be a center guard bar character that is selected based on a number of modules that make up the bar code character. During decoding, the process may be repeated for one or more additional sets of bar code characters. The score can be computed based on a confidence level in the decoded bar code character value. A number of bar code character values that have an associated score above a threshold amount can be determined and the decoding terminated when a sufficient number of values have a score above the threshold. A bar code direction can be determined based on the character values or by comparing the character values to predetermined bar code symbol conventions. The predetermined bar code symbol convention can be the parity of the character values. An overall bar code character value score for the set of characters being acted upon can be computed by determining a number of bar code character values having an associated score over a threshold score and taking into account a confidence that the determined direction is accurate. Bar code character values in a primary buffer can be selectively updated with the bar code character values stored in the first data buffer based on the score associated with each bar code character value.

BRIEF DESCRIPTION OF DRAWINGS

FIG. 1 is a block diagram of a bar code scanner that is capable of decoding bar codes using data from multiple scans according to one embodiment of the present invention;

FIG. 4 is a flow chart detailing a part of the method of FIG. 2 that is used to decode bar codes using data from multiple scans according to one embodiment of the present invention;

FIG. 7 is a chart showing the contents of a set of scan buffers during practice of one embodiment of the present invention.

DESCRIPTION

In the following detailed description, reference is made to the accompanying drawings which form a part hereof, and in which are shown by way of illustration specific embodiments in which the invention may be practiced. It is to be understood that other embodiments may be utilized and structural changes may be made without departing from the scope of he present invention.

Laser Scanner

Figure 5:
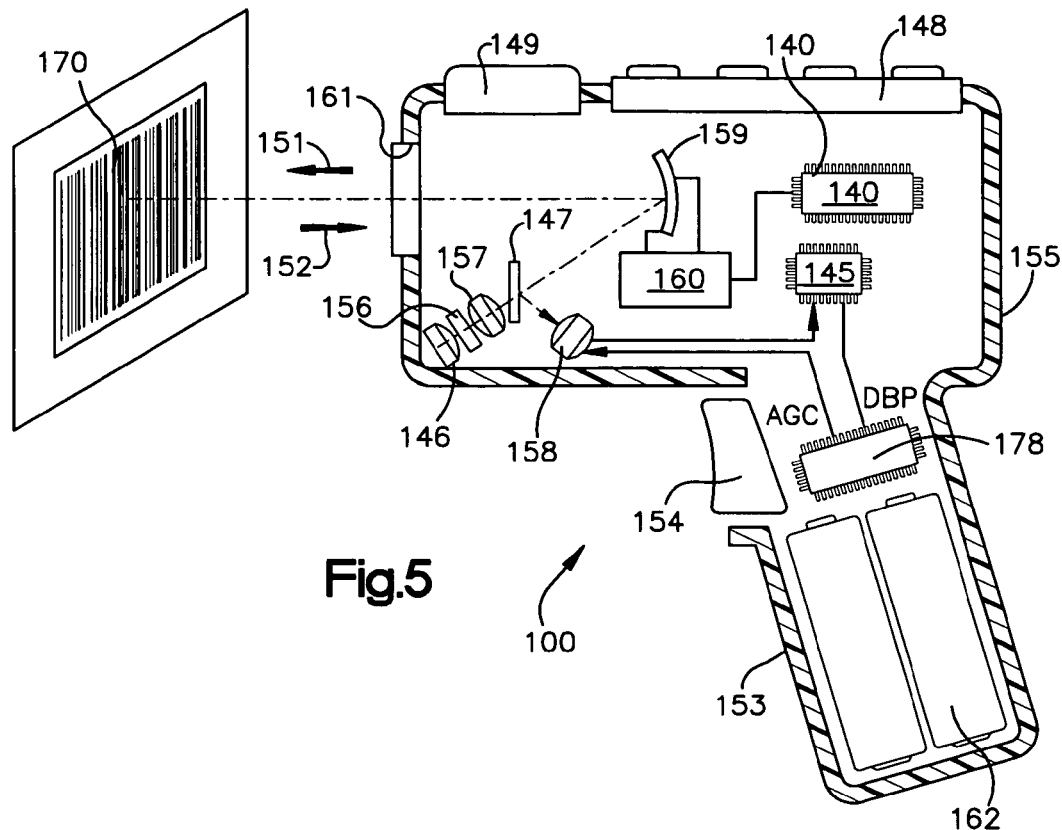
FIG. 5 is a schematic view of a hand-held laser scanner that can be used in practice of one embodiment of the present invention.

FIG. 5 shows a simplified embodiment of a laser bar code scanner 100. While the bar code scanner depicted in FIG. 5 is a hand held device, other types of scanners may be used to practice the signal decoding technique described below. In addition, the signal decoding technique described below can be used with an imaging scanner that performs a virtual scan on a stored image of the bar code, such as the imaging scanner described in U.S. Pat. Nos. 6,250,551 and 6,405,925. It will be apparent to one of ordinary skill in the art that the treatment of the virtual scan data in the imaging scanner is similar to that discussed herein with respect to the laser scanner. As shown in FIG. 5, a user aims the laser scanner 100 at a bar code symbol 170 without physically touching it. Typically, the scanner 100 operates in a range from contact with the bar code symbol to several inches from the bar code symbol being read. Scanner 100 may be gun-shaped in a housing 155 having a pistol grip handle 153. A movable trigger 154 on handle 153 allows a user to activate a light beam 151 and associated detector circuitry when the user has pointed scanner 100 at a symbol 170.

The housing 155 contains a light source 146, an aperture 156, a lens 157, a partially-silvered mirror 147, a detector 158, an oscillating mirror 159, a motor 160, a battery 162, a CPU 140, and a digitizer circuit 145. A multi-scan decoder 178, which will be described in detail below, is shown removed from the scan engine but located within the housing 155. In some applications the decoder is located in a remote location such as a user terminal. The multi-scan decoder 178 receives the DBP signal from the digitizer 145 on a single signal line in the described embodiment. However, any digitizer to decoder interface can be used in the practice of the present invention.

When a user activates the scanner by pulling the trigger 154, the light source 146 generates a light beam 151 along the axis of the lens 157 that travels through the aperture 156. The lens 157, which is not necessary in all embodiments, may be a single lens or a multiple lens system. After passing through the lens 157, the beam 151 passes through the partially-silvered mirror 147, and if desired, other lenses or beam shaping structures. The beam 151 then strikes oscillating mirror 159 driven by a scanning motor 160, which together direct the beam 151 in a scanning pattern as the beam exits through an exit window 161.

The light beam 152 is the light from the beam 151 that is reflected off the symbol 170. The beam 152 returns to the scanner 100 along a path parallel to, or at times coincident with, the beam 151. The beam 152 thus reflects off the mirror 159 and strikes the partially-silvered mirror 147. The mirror 147 reflects some of the beam 152 into a light-responsive detector 158 that converts the light beam 152 into analog electric signals. The electric signals then pass into the digitizer 145 and multi-scan decoder 178 to be processed and decoded to extract the information represented by the bar code. The microprocessor 140 is also used to control the operation of the motor 160 to adjust the scanning pattern and provide other control.

UPC Bar Code

Figure 6:
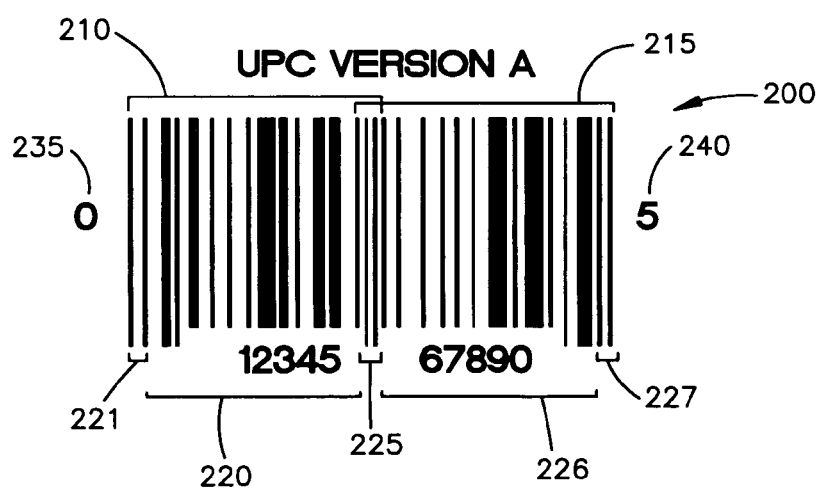
FIG. 6 is an example UPC bar code symbol presented for discussion.

For the purposes of the present description, a UPC Type A bar code will be referenced. It will be apparent to one of ordinary skill in the art that the described decoding techniques can be employed to decode various types of bar codes. A typical UPC Version A symbol is shown at 200 in FIG. 6. The bar code is used to encode the 10 character Universal Product Code associated with the item that it identifies. An eleventh character 235 indicates the origin country of the product, and a twelfth character 240 is a modulo check character. The symbol is divided into a left block 210 and right block 215. Each block includes a left or right guard bar 221, 227, a center guard bar 225 and 6 characters 220, 226. Each character has a width of 7 modules, while the guard bars have a width of 3 or 5 modules. The left block uses an odd parity encodation while the right block uses an even parity encodation. Although the UPC symbol is continuous, the left and right blocks of the symbol can be decoded independently.

A typical UPC Version A symbol has center guard bars 225 in the center of the symbol which are longer than the other bars. This center guard bar divides the symbol into the left and right blocks. This division allows the symbol to scan in any orientation. The moving beam laser bar code reader produces orthogonal scanning beams so that at least one beam will pass through each half of the symbol, since the symbol's height is generally at least equal to half of the length of the symbol. As described above, successful decodes of each block can be combined to form a complete decode. Typically, data from unsuccessful attempts to decode a block is discarded. However, data from these partial decodes can be combined as will be described below to form a complete decode.

Combining Data from Multiple Scans

FIG. 1 is an overview block diagram of components that can be used to combine data from multiple scans. A digitized version of the bar code signal is sent from the digitizer 145 to the multi-scan decoder 178. The multi-scan decoder includes a single scan decoder 175 that decodes data from a single scan that may or may not result in a complete decode of the bar code symbol. The decoder 175 has typically been used to perform block decoding that operates on each block of the symbol that contains half of the symbol's encoded characters. As described above, the decoded data from scans that did not result in at least one block being decoded is typically discarded. The multi-scan decoder 178 saves all partially decoded block data in a temporary buffer 180 along with a score associated with each decoded character. The score for each character is based on a level of confidence in the accuracy of the decoding for that character. A primary buffer 185 is updated by a scan combination tool 190 that replaces the contents of the primary buffer 185 on a per character basis based on the scores associated with the scanned characters in the temporary buffer 180. FIG. 7 shows the contents of the temporary and primary buffers over the course of three scans.

Figure 2:
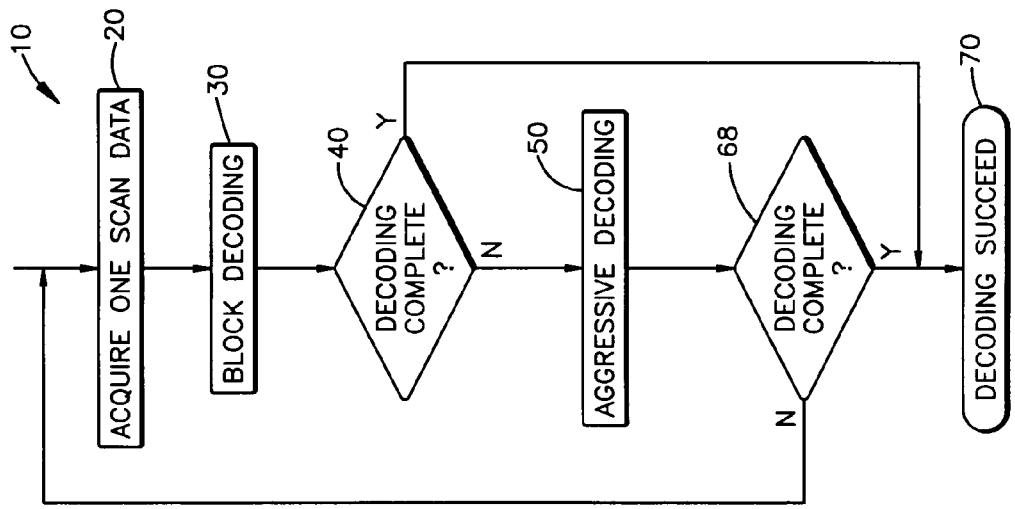
FIG. 2 is a flow chart outlining a method implemented by the bar code scanner of FIG. 1 to decode bar codes using data from multiple scans when necessary according to one embodiment of the present invention.

FIG. 2 is a flowchart showing an overview of one decoding method 10 that can be employed by the multi-scan decoder to process bar code symbols. At 20 data from a single scan line is acquired. Initially, an attempt is made to decode one or both blocks of the symbol at 30. In many instances, the symbol will be completely decoded at this step and at 40 if this is the case the decoding is considered successful at 70. If the decoding is not successful at 40, an aggressive decoding technique is attempted at 50. If the aggressive decoding is successful at 68 the decoding is considered successful at 70.

Figure 3:
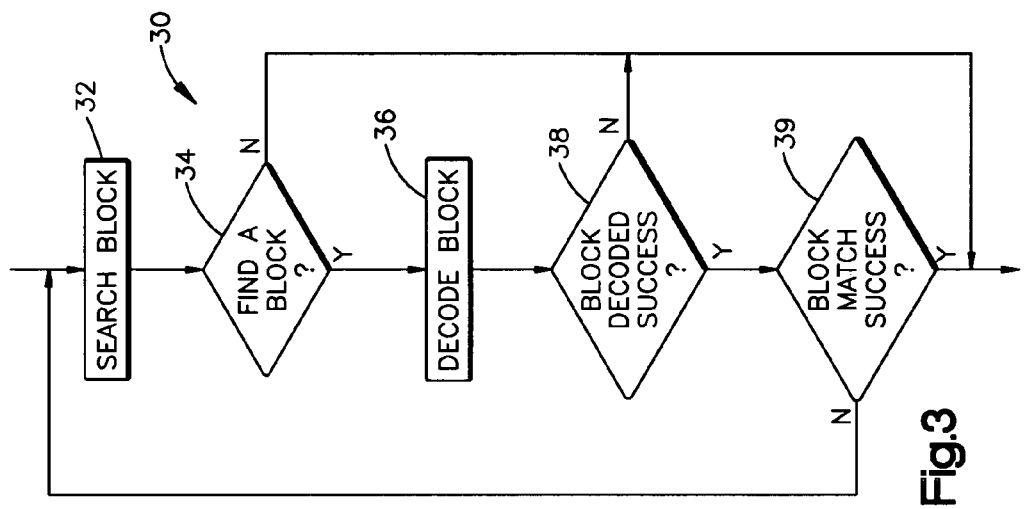
FIG. 3 is a flow chart detailing a part of the method of FIG. 2 that is used to decode bar codes using data from multiple scans according to one embodiment of the present invention.

FIG. 3 is a more detailed flowchart that outlines the block decoding method 30 that is employed in the method of FIG. 2. At 32, the scan data is searched to attempt to locate one or both blocks of the symbol. The method searches the data for either of the left/right guard bars and the center guard by using the criteria that the guard bars have a width of either 3 or 5 modules while each character of encoded data has a width of 7 modules. If a block is found at 34 the block is decoded at 36. Conventional techniques are used to decode the block and as such will not be discussed here. If a block is successfully decoded at 38 the block is compared to the other decoded block of the symbol at 39 to verify that both blocks correspond to the same type of bar code symbol. For example, UPC/EAN blocks can be EAN-13 left/right blocks, EAN-8left/right blocks, UPCE blocks, or supplemental blocks, etc. . . . Each of these types of blocks has its own configuration of left/right guard bars, center bars, and numbers of characters encoded in each block. At 39 these characteristics are compared between the successfully decoded blocks to make sure that they both indicate the same type of signal. If the blocks match at 39, the block decode method 30 ends as does the overall method 10 shown in FIG. 2 at 40. If the block does not match the method 40 is repeated using another identified potential block of the symbol until potential blocks are exhausted at which point the overall method moves to aggressive decoding at 50.

FIG. 4 shows the aggressive decoding method 50 in more detail. This method is employed when the block decode fails to attempt piece together a successful decode from several partially successful decodes that only decode a subset of bar code characters in a given block. At 51 the scan data is searched and a bar code character that most likely corresponds to the center guard bar ("CGB") is selected. If no potential center guard bar is located at 52 the aggressive decoding method exits and returns to the overview method 10 at 68 to acquire data from another scan at 20. Potential center guard bars are scored based on the ratio of its size to surrounding characters, which should have widths of 7 modules compared to the 5 module width of the center guard bar. Also the number of characters located on either side of the center bar guard candidate is examined and if the number of characters on either side matches or the number of characters on one side correspond to the number of characters expected in a block the center guard bar is given a higher score. The area surrounding the potential center guard bar is searched to determine if a margin is present, which also contributes to the score. It will be apparent to one of ordinary skill in the art that other criteria can be used to quantify a likelihood that a given bar code character is a center guard bar, and could therefore be employed to score guard bar candidates. The center guard bar candidate with the highest score is selected from among the candidates based on the cumulative score.

At 53, the block to the right of the center guard bar is decoded starting from the center guard bar. The results of the decoding for each bar code character is saved in the temporary buffer along with a score that gives an indication of the confidence in the accuracy of the decoding of the given character. If any character has a width that is significantly shorter than its neighbors, it is skipped and no result is given for that character or stored in the temporary buffer. If the right-most character in the block was not successfully decoded at 54, the right block is decoded from the right end at 55. Any characters that are decoded from this direction are stored in the temporary buffer along with their quality scores.

At 56-58 this process is repeated with the block to the left of the center guard bar. At 59 the contents of the primary buffer are checked and if enough characters have been decoded with a high enough score, at 60 the bar code direction is determined using parity information that is known about the type of symbol being decoded. For example, all characters in the right block of UPC and EAN-13 symbols are even, the characters in the left block of EAN-13 are half even and half odd, and all the characters in the left block of UPC symbols are odd. If the parity check does not definitively determine a bar code direction, the decoded symbols are compared with the contents of the primary buffer to see if the direction of the primary buffer corresponds to either orientation of the presently decoded characters. To determine if the decode is good enough to be used to update the primary buffer, at 61 the scores of each character, the confidence level or score of the center guard bar that was selected, and the number of skipped characters, as well as the confidence of the direction that has been selected are considered. If the decode meets requirements for these criteria, the decode data is used to update the primary buffer at 62 as will be described below in connection with FIG. 7. When the aggressive bar code method has been performed it rejoins the overview method 20 at 68 with a temporary buffer that has a decoded character and score or a non-decode indicator character in each position as shown in FIG. 7 and an updated primary buffer if the data in the temporary buffer is good enough to warrant such an update.

Referring to FIG. 7 (and also 62 in FIG. 4) the contents of the primary buffer are updated with the data from the present partial decode being analyzed if the above criteria are met. On the first scan that produces an acceptable partial decode, the contents of the temporary buffer are loaded into the primary buffer as can be seen in the first line pair in FIG. 7. The decoded character value is shown in the top line of the pair while the score associated with the value is shown in the bottom line of the pair. An "X" in the data value line indicates that the character was not successfully decoded. A second successful scan produces data and scores that are used to update the primary buffer so that it results in the data and scores shown in the second line pair. If a character in the subsequent scan decodes as the same value, the character's value in the primary buffer remains the same and the score in the temporary buffer is added to the score in the primary buffer. If a previously undecoded character is decoded in a subsequent scan, its decoded value and score are stored in the primary buffer. As can be seen from the third line pair, the fourth character in the right block of the primary buffer, if a subsequent scan produces a character value that does not correspond to the value already stored in the primary buffer the value with the higher associated score is selected for storage in the primary buffer, if the difference in scores is high enough. Otherwise an unknown is used for this character (this is the case in FIG. 7). The resultant bar code character value is changed to unknown when the resultant bar code character value is different from the scanned bar code character value and the scores associated with each value are both higher than a score threshold. The primary buffer can continue to be updated until the score for each character reaches a threshold value or the decode attempt is terminated by other means such as maximum number of scan attempts, a time-out, or a user initiated termination.

As can be seen from the above description, saving the results of partial decode results and associating a score with each character in the results allows the results to be combined to produce a more complete scan based on the scores. Although the present invention has been described with a degree of particularity, it is the intent that the invention includes all modifications and alterations from the disclosed design falling within the spirit or scope of the appended claims.

I claim:

1. A method that decodes a bar code symbol that is made up of a plurality of bar code characters, the method comprising:
   scanning the bar code symbol a plurality times to obtain one or more signals representative of the bar code characters;
   decoding the one or more signals to determine a sequence of scanned bar code character values;
   associating a score with each scanned bar code character values;
   storing one or more sequences of scanned bar code character values and their associated scores in a first buffer;
   providing a second buffer that stores a sequence of resultant bar code character values and a cumulative score associated with each resultant bar code character value, an initial sequence of resultant bar code character values and an initial cumulative score associated with each resultant bar code character value being obtained from a first scan of the bar code symbol that results in a successful decode of at least some of the plurality of bar code characters; and
   updating one or more resultant bar code character values in the second buffer with corresponding one or more scanned bar code character values in the first buffer based on the score associated with the respective scanned bar code character values in the first buffer.

2. The method of claim 1 wherein the score associated with each bar code character value is computed by determining a level of confidence that the bar code character value is accurate.

3. The method of claim 1 wherein a resultant bar code character value is updated by:
   comparing the resultant bar code character value with the corresponding scanned bar code character value; and
   adding the score associated with the scanned bar code character value to the cumulative score when the resultant bar code character value is the same as the corresponding bar code character value;
   storing the scanned bar code character value as the resultant bar code value and the score associated with the scanned bar code character value as the cumulative score when no value has yet been stored as the resultant bar code character value;
   replacing the resultant bar code character value with the scanned bar code character value when the score associated with the scanned bar code character value exceeds the cumulative score associated with the resultant bar code character value by a threshold amount; and
   changing the resultant bar code character value to unknown when the resultant bar code character value is different from the scanned bar code character value and a difference between the scores associated with the values is below a minimum score difference.

4. The method of claim 1 comprising terminating the method when the cumulative score associated with each character exceeds a predetermined value.

5. A method of decoding a bar code symbol made up of a sequence of bar code characters grouped into a plurality of sets of decodable characters separated by separation characters, the method comprising: scanning the symbol and identifying one or more bar code characters that may be separation characters, the separation characters not being part of the plurality of sets of decodable characters that define a set of bar code characters; selecting an identified bar code character as a working separation character; decoding bar code characters in a first set of decodable characters that are in one side of proximity to the working separation character; decoding bar code characters in a second set of decodable characters that are in another side of proximity to the working separation character; storing a bar code character value in a first data buffer for each decoded bar code character; and associating a bar code character value score with each decoded bar code character; and selectively updating bar code character values in a primary buffer with the bar code character values stored in the first data buffer based on the score associated with each bar code character value.

6. The method of claim 5 wherein the identified bar code character is selected based on a score that is calculated based on characteristics of separation characters.

7. The method of claim 5 wherein the identified bar code character is a center guard bar character that is selected based on a number of modules that make up the bar code character.

8. The method of claim 5 comprising repeating the method for one or more additional sets of bar code characters.

9. The method of claim 5 wherein the score is computed based on a confidence level in the decoded bar code character value.

10. The method of claim 5 comprising determining a number of bar code character values that have an associated score above a threshold amount and terminating the method if the number is below a minimum number of bar code character values.

11. The method of claim 5 comprising determining a bar code direction based on the character values.

12. The method of claim 11 wherein the bar code direction is determined by comparing the character values to predetermined bar code symbol conventions.

13. The method of claim 12 wherein the predetermined bar code symbol convention is the parity of the character values.

14. The method of claim 5 comprising computing an overall bar code character value score for the set of characters being acted upon.

15. The method of claim 14 wherein the overall bar code character value score is computed by determining a number of bar code character values having an associated score over a threshold score.

16. The method of claim 11 comprising computing an overall bar code character value score for the set of characters being acted upon based on a confidence that the determined direction is accurate.

17. Computer readable media having computer executable instructions stored thereon for decoding a bar code symbol that is made up of a plurality of bar code characters, the instructions comprising:
scanning the bar code symbol a plurality of times to obtain one or more signals representative of the bar code characters;
decoding the one or more signals to determine a sequence of scanned bar code character values;
associating a score with each scanned bar code character values; storing one or more sequences of scanned bar code character values and their associated scores in a first buffer;
providing a second buffer that stores a sequence of resultant bar code character values and a cumulative score associated with each resultant bar code character value, an initial sequence of resultant bar code character values and an initial cumulative score associated with each resultant bar code character value being obtained from a first scan of the bar code symbol that results in a successful decode of at least some of the plurality of bar code characters; and
updating one or more resultant bar code character values in the second buffer with corresponding one or more scanned bar code character values in the first buffer based on the score associated with the respective scanned bar code character values in the first buffer.

18. The computer readable media of claim 17 wherein the score associated with each bar code character value is computed by determining a level of confidence that the bar code character value is accurate.

19. The computer readable media of claim 18 wherein the instructions update a resultant bar code character value by:
comparing the resultant bar code character value with the corresponding scanned bar code character value; and
adding the score associated with the scanned bar code character value to the cumulative score when the resultant bar code character value is the same as the corresponding bar code character value;
storing the scanned bar code character value as the resultant bar code value and the score associated with the scanned bar code character value as the cumulative score when no value has yet been stored as the resultant bar code character value;
replacing the resultant bar code character value with the scanned bar code character value when the score associated with the scanned bar code character value exceeds the cumulative score associated with the resultant bar code character value by a threshold amount; and
changing the resultant bar code character value to unknown when the resultant bar code character value is different from the scanned bar code character value and the difference between the scores associated with both values is below a minimum difference.

20. The computer readable media of claim 17 wherein the instructions include terminating the method when the cumulative score associated with each character exceeds a predetermined value.

21. Computer readable media having computer executable instructions stored thereon for decoding a bar code symbol made up of a sequence of bar code characters grouped into a plurality of sets of decodable characters separated by separation characters, the instructions comprising: scanning the symbol and identifying one or more bar code characters that may be separation characters, the separation characters not being part of the plurality of sets of decodable characters that define a set of bar code characters; selecting an identified bar code character as a working separation character; decoding bar code characters in a first the set of decodable characters that are in one side of proximity to the working separation character; decoding bar code characters in a second set of decodable characters that are in another side of proximity to the working separation character; storing a bar code character value in a first data buffer for each decoded bar code character; and associating a bar code character value score with each decoded bar code character; wherein the instructions include selectively updating bar code character values in a primary buffer with the bar code character values stored in the first data buffer based on the score associated with each bar code character value.

22. The computer readable media of claim 21 wherein the identified bar code character is selected based on a score that is calculated based on characteristics of separation characters.

23. The computer readable media of claim 21 wherein the identified bar code character is a center guard bar character that is selected based on a number of modules that make up the bar code character.

24. The computer readable media of claim 21 wherein the instructions include repeating the method for one or more additional sets of bar code characters.

25. The computer readable media of claim 21 wherein the score is computed based on a confidence level in the decoded bar code character value.

26. The computer readable media of claim 21 wherein the instructions include determining a number of bar code character values that have an associated score above a threshold amount and terminating the method if the number is below a minimum number of bar code character values.

27. The computer readable media of claim 21 wherein the instructions include determining a bar code direction based on the character values.

28. The computer readable media of claim 21 wherein the instructions include determining a bar code direction by comparing the character values to predetermined bar code symbol conventions.

29. The computer readable media of claim 28 wherein the predetermined bar code symbol convention is the parity of the character values.

30. The computer readable media of claim 21 wherein the instructions include computing an overall bar code character value score for the set of characters being acted upon.

31. The computer readable media of claim 30 wherein the overall bar code character value score is computed by determining a number of bar code character values having an associated score over a threshold score.

32. The computer readable media of claim 27 comprising computing an overall bar code character value score for the set of characters being acted upon based on a confidence that the determined direction is accurate.

33. An apparatus that decodes a bar code symbol that is made up of a plurality of bar code characters, the apparatus comprising:
   a scanner that scans the bar code symbol a plurality of times to obtain one or more signals representative of the bar code characters;
   a decoder that decodes the one or more signals to determine a sequence of scanned bar code character values and associates a score with each scanned bar code character value;
   a first buffer for storing one or more sequences of scanned bar code character values and their associated scores;
   a second buffer that stores a sequence of resultant bar code character values and a cumulative score associated with each resultant bar code character value, an initial sequence of resultant bar code character values and an initial cumulative score associated with each resultant bar code character value being obtained from a first scan of the bar code symbol that results in a successful decode of at least some of the plurality of bar code characters; and
   a resultant bar code character update tool that updates one or more resultant bar code character values in the second buffer with corresponding one or more scanned bar code character values in the first buffer based on the score associated with the respective scanned bar code character values in the first buffer.

34. The apparatus of claim 33 wherein the resultant bar code character update tool updates data in the second buffer by:
   comparing the resultant bar code character value with the corresponding scanned bar code character value; and
   adding the score associated with the scanned bar code character value to the cumulative score when the resultant bar code character value is the same as the corresponding bar code character value;
   storing the scanned bar code character value as the resultant bar code value and the score associated with the scanned bar code character value as the cumulative score when no value has yet been stored as the resultant bar code character value;
   replacing the resultant bar code character value with the scanned bar code character value when the score associated with the scanned bar code character value exceeds the cumulative score associated with the resultant bar code character value by a threshold amount; and
   changing the resultant bar code character value to unknown when the resultant bar code character value is different from the scanned bar code character value and the difference between the scores associated with both values is below a minimum difference.

35. The apparatus of claim 33 wherein the scanner is a laser scanner.

36. The apparatus of claim 33 wherein the scanner is a processing unit that acts upon an image of the bar code to perform a virtual scan of the bar code.

37. An apparatus for decoding a bar code symbol made up of a sequence of elements grouped into a plurality of sets of decodable bar code characters separated by separation characters, the apparatus comprising: a scanner that scans the symbol and identifies one or more identifying two bar code characters that may be separation characters, the separation characters not being part of the plurality of sets of decodable characters that define a first set of bar code characters; a multi-scan decoder that selects one or more identified bar code characters as a working separation character; decodes bar code characters in a first set of decodable characters that are in one side of proximity to the working separation character; decodes bar code characters in a second set of decodable characters that are in another side of proximity to the working separation character; stores a bar code character value in a first data buffer for each decoded bar code character; and associates a bar code character value score with each decoded bar code character; and comprising bar code character value update tool that updates a primary buffer with the bar code character values stored in the first data buffer based on the score associated with each bar code character value.

38. The apparatus of claim 37 wherein the scanner is a laser scanner.

39. The apparatus of claim 37 wherein the scanner is a processing unit that acts upon an image of the bar code to perform a virtual scan of the bar code.

* * * * *

UNITED STATES PATENT AND TRADEMARK OFFICE
CERTIFICATE OF CORRECTION

PATENT NO.        : 7,422,153 B2                                            Page 1 of 1
APPLICATION NO.   : 11/290169
DATED             : September 9, 2008
INVENTOR(S)       : Joseph Cai It is certified that error appears in the above-identified patent and that said Letters Patent is hereby corrected as shown below:

IN THE DRAWINGS

In Fig. 4, Sheet 3 of 4, delete " 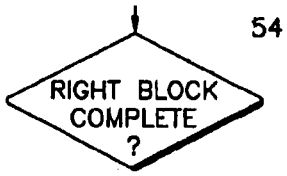 " and insert -- 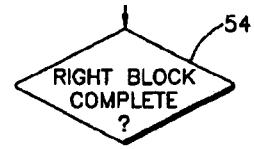 --, therefor.

In Column 8, Line 4, in Claim 1, after "plurality" insert -- of --.

Signed and Sealed this

Tenth Day of August, 2010

David J. Kappos
*Director of the United States Patent and Trademark Office*